US 7,985,373 B2

(12) United States Patent
Mardon et al.

(10) Patent No.: US 7,985,373 B2
(45) Date of Patent: *Jul. 26, 2011

(54) ALLOY AND TUBE FOR NUCLEAR FUEL ASSEMBLY AND METHOD FOR MAKING SAME

(75) Inventors: Jean-Paul Mardon, Caluire (FR); Jean Senevat, Annecy (FR); Daniel Charquet, Albertville (FR)

(73) Assignee: Framatome ANP, Courbevoie (FR)

( * ) Notice: Subject to any disclaimer, the term of this patent is extended or adjusted under 35 U.S.C. 154(b) by 1033 days.

This patent is subject to a terminal disclaimer.

(21) Appl. No.: 10/728,239

(22) Filed: Dec. 3, 2003

(65) Prior Publication Data

US 2011/0158374 A1 Jun. 30, 2011

Related U.S. Application Data

(63) Continuation-in-part of application No. 09/647,339, filed as application No. PCT/FR99/00737 on Mar. 30, 1999, now abandoned.

(30) Foreign Application Priority Data

Mar. 31, 1998 (FR) ..................... 98 03970

(51) Int. Cl.
*C22C 16/00* (2006.01)
(52) U.S. Cl. ........................................ 420/422
(58) Field of Classification Search .............. 420/422
See application file for complete search history.

(56) References Cited

U.S. PATENT DOCUMENTS

| 4,212,686 A * | 7/1980 | Lunde et al. ............... 420/422 |
| 4,649,023 A * | 3/1987 | Sabol et al. ............... 420/422 |
| 5,023,048 A | 6/1991 | Mardon et al. |
| 5,112,573 A | 5/1992 | Foster et al. |
| 5,125,985 A | 6/1992 | Foster et al. |
| 5,230,758 A | 7/1993 | Foster et al. |
| 5,254,308 A | 10/1993 | Garde et al. |
| 5,266,131 A | 11/1993 | Foster et al. |
| 5,560,790 A | 10/1996 | Nikulina et al. |
| 5,648,995 A * | 7/1997 | Mardon et al. ............... 376/261 |
| 5,832,050 A * | 11/1998 | Rebeyrolle et al. ............ 376/457 |
| 6,863,745 B1 * | 3/2005 | Charquet et al. ............. 148/421 |

FOREIGN PATENT DOCUMENTS

| EP | 0 533 073 | 3/1993 |
| EP | 720177 | 3/1996 |
| FR | 2729000 | 5/1996 |
| JP | 63-145735 | 6/1988 |
| JP | 04-128687 | 4/1992 |
| WO | WO 94/23081 | 10/1994 |

OTHER PUBLICATIONS

Mallory-Sharon Metals Corp., Ashtabula, Ohio, "Zirconium Analysis by Production Control Quantometer" Analytical Chemistry (U.S.) Formerly Ind. Eng. Chem., Anal. Ed.; vol. 31, No. 11, pp. 1867-1868, Nov. 1, 1959.*
Standard Specification for Zirconium Sponge and Other Forms of Virgin Metal for Nuclear Application; American Society for Testing Materials, Designation B 349-93, pp. 151-152, 1993.
ASTM Standards B349, "Standard Specification for Zirconium Sponge and Other Forms of Virgin Metal for Nuclear Application".
ASTM Standards B350, "Standard Specification for Zirconium and Zirconium Alloy Ingots for Nuclear Application".
ASTM Standards B353, "Standard Specification for Wrought Zirconium and Zirconium Alloy Seamless and Welded Tubes for Nuclear Service (Except Nuclear Fuel Cladding)".
Mardon, J.P., et al., "Development of New Zirconium Alloys for PWR Fuel Rod Cladding", American Nuclear Society Inc., "Proceedings of the 1994 International Topical Meeting on Light Water Reactor Fuel Performance", West Palm Beach Florida, Apr. 17-24, 1994.
Charquet, D., "Improvement of the Uniform Corrosion Resistance of Zircaloy-4 in the Absence of Irradiation", Journal of Nuclear Materials, pp. 186-195 (1988).
Charquet, D., et al. "Hydrogen Absorption Kinetics During Zircaloy Oxidation in Steam", Anand M. Garde and E. Ross Bradley, "Zirconium in the Nuclear Industry: Tenth International Symposium", STP 1245 ASTM, (1994), pp. 80-97.
Kass, S., "The Development of the Zircaloys;" Corrosion of Zirconium Alloys: A Symposium Presented at the 1963 Winter Meeting of the American Nuclear Society, ASTM STP 368, (1964).
Kass, S., "The Development of the Zircaloys," in Proc. Symp. on Zirconium Alloy Development, Castlewood, Pleasanton, California, Nov. 12-14, 1962; Report GEAP-4089, U.S. Atomic Energy Commission.
VanSwam et al., Zirconium in the Nuclear Industry: Eighth International Symposium, Jun. 1988, ASTM, pp. 227-244.

* cited by examiner

*Primary Examiner* — Roy King
*Assistant Examiner* — Jessee R. Roe
(74) *Attorney, Agent, or Firm* — Davidson, Davidson & Kappel, LLC

(57) ABSTRACT

The invention concerns an alloy containing equally 0.02 to 0.07% wt. % of the total iron, of chromium or vanadium, 0.8 to 1.3 wt. % of niobium, 100 ppm or less of tin, 1100 to 1700 ppm of oxygen, less than 100 ppm of carbon, 10 to 30 ppm of sulphur and less than 50 ppm of silicon.

7 Claims, No Drawings

ALLOY AND TUBE FOR NUCLEAR FUEL ASSEMBLY AND METHOD FOR MAKING SAME

CROSS-REFERENCE TO RELATED APPLICATIONS

This application is a continuation-in-part of application Ser. No. 09/647,339, filed Nov. 27, 2000 now abandoned, which is a national stage entry of PCT/FR99/00737, filed on Mar. 30, 1999.

The present invention relates to tubes made from an alloy with a zirconium base intended for making all or the external part of the sheath of a nuclear fuel rod or a guide tube as well as the alloys used to make such tubes. Once important although not exclusive application is the manufacture of sheathing tubes for fuel rods designed for those of light water reactors and in particular pressurized water reactors in which the risks of corrosion are particularly high due to a high lithium content and/or risks of boiling.

A method of manufacturing tubes enabling a high resistance to corrosion and a satisfactory capacity to withstand creep has already been proposed (FR A-2 729 000 or EP 720 177), starting with an ingot of a zirconium based alloy which also contains 50 to 250 ppm of iron, 0.8 to 1.3% by weight of niobium, less than 1600 ppm of oxygen, less than 200 ppm of carbon and less than 120 ppm of silicon.

An object of this invention is to provide an alloy and a method of manufacturing tubes which are even more resistant to corrosion and whose composition will not hamper the rolling stages of manufacture.

To this end, the invention proposes in particular an alloy with a zirconium base which also contains, by weight, other than the inevitable impurities, 0.02 to 0.07% in total firstly of iron, secondly of at least one of the elements from the group comprising chromium and vanadium, with 0.8 to 1.3% of niobium, 100 ppm of tin or less, 1100 to 1700 ppm of oxygen, less than 100 ppm of carbon, 10 to 35 ppm of sulfur and less than 50 ppm of silicon, the ratio between the iron content firstly and the chromium or vanadium content secondly ranging between 0.5 and 30.

If it has a low content of iron, chromium, vanadium and tin, a sheet of an alloy of this type can also be used to make grill plates for a nuclear fuel assembly.

The invention also proposes a casing tube for a nuclear fuel rod or guide tube for a fuel assembly made from an alloy with a zirconium base, also containing, by weight, 0.02 to 0.07% in total of, firstly iron, secondly, at least one of the elements from the group comprising chromium and vanadium, 0.8 to 1.3% by weight of niobium, 100 ppm of tin or less, 1100 to 1700 ppm of oxygen, less than 100 ppm carbon, 10 to 35 ppm of sulfur and less than 50 ppm of silicon, in the recrystallized state, at least the greater part of the iron therein being in the form of $Zr(Nb,Fe,Cr)_2$ or $Zr(Nb,Fe,V)_2$.

The invention also proposes a manufacturing method, comprising:
 forming a bar of a zirconium based alloy which also contains, other than the inevitable impurities, 0.02 to 0.07% in total firstly of iron, secondly, of at least one of the elements from the group comprising chromium and vanadium, having 0.8 to 1.3% of niobium, at most 100 ppm of tin, 1100 to 1700 ppm of oxygen, less than 100 ppm of carbon, 10 to 35 ppm of sulfur and less than 50 ppm of silicon, the ratio between firstly the iron content and secondly the chromium or vanadium content ranging between 0.5 and 30, quenching the bar in water after heating to between 1000° C. and 1200° C.,
extruding a blank after heating to a temperature of between 600° C. and 800° C.,
cold rolling said blank in at least four passes to obtain a tube, with intermediate heat treatments between 560° C. and 620° C., and
applying a final heat treatment at between 560° C. and 620° C., all heat treatments being applied in an inert atmosphere or under vacuum.

The final heat treatment brings the tube to the recrystallized state without modifying the nature of the phases.

More often than not, an alloy without vanadium will be used. However, vanadium may replace some of the chromium for a high Fe/Cr ratio or even all.

In alloys containing approximately 1% of Nb, the presence of iron with a content in excess of 75 ppm and chromium and/or vanadium in a content in excess of 5 ppm produces iron contents of not more than 0.20% with intermetallic compounds of the type $Zr(Nb,Fe,Cr)_2$ or $Zr(Nb,Fe,V)_2$. Chromium is always present to form such compounds if contained in the alloy in a quantity of more than 5 ppm. The existence of the intermetallic compound reduces the quantity of β phase niobium precipitates and also reduces the niobium content in solid solution.

The above-mentioned intermetallic compounds, which constitute a Laves phase, precipitate in a very fine form, with a size of between 100 and 200 nanometers. They substitute to the precipitates of phase β niobium. They significantly improve the resistance in a lithium-containing medium without significantly affecting the uniform resistance to corrosion at a temperature of 400° C., representative of the temperature prevailing in reactors.

It is preferable not to exceed a total Fe+(Cr and/or V) content of 2500 ppm (i.e. 0.25% by weight), even though higher contents remain beneficial in terms of resistance to corrosion in a lithium-containing medium. The reason for this is that, in addition to the Laves phase, a precipitate of the type $(Zr,Nb)_4Fe_2$ appears, the diameter of which can be as much as 1 μm and which is detrimental from the point of view of rollability. A maximum content of 0.20% constitutes a compromise close to optimum between corrosion in a lithium-containing medium and rollability.

The presence of chromium in the intermetallic precipitates of type $Zr(Nb, Fe, Cr)_2$ does not have any marked effect on corrosion at 400° C. up to a Fe/Cr ratio of about 30 because in this range, chromium is simply substituted for iron in the intermetallic precipitates as the chromium content increases. Improved resistance to corrosion at 400° C. is obtained if the Fe/(Cr+V) ratio is higher than 0.5 and the sum of Fe+Cr+V is at least 0.03%.

According to the invention, the total of iron, chromium and vanadium contents ranges between 200 and 700 ppm. So, it is not compulsory to use, for the making of the ingot, zirconium sponges having a particularly low content in iron. To this end, it would be necessary to rigorously select the raw materials and to control the iron recovered from the reaction basket and from the magnesium during the making of the sponge. Moreover, the relative proportions of β niobium (which remains predominant) and of intermetallic precipitate $Zr(Nb, Fe, Cr$ or $V)_2$ appear to be optimal in this range. In particular, it can be seen that:
 the resistance to uniform corrosion in autoclave does not depend on the iron content in the considered range;
 the resistance to corrosion in autoclave in a lithium-containing medium is improved by an increase in the iron content, within the considered range;

the sensitivity of the alloy to corrosion by galvanic coupling in an oxygenated medium is decreased by an iron addition; an iron content higher than 500 ppm is, though, not very useful in that respect;

the creep resistance is not significantly decreased within the considered range;

within the considered range, the tensile mechanical features at ambient temperature or in a hot state, measured on sheathing tubes, only show a slight hardening, of little significance, when the iron content increases;

the resistance to cracking of the alloy is not altered by the iron content within the considered range;

within the considered range, the texture is not influenced by the iron content;

within the considered range, in a pressurized water reactor, the resistance to corrosion and hydruration, growth and creep are not influenced by the iron content;

in accidental conditions (loss of primary coolant accident, reactivity accident), an increase of the iron content within the considered range is without any significant influence on the main mechanical properties.

Table I below illustrates how the iron content affects the corrosion behavior of a sample of zirconium alloy with 1% of niobium for different iron contents:

TABLE I

| | Mass increase (mg/dm$^2$) | |
|---|---|---|
| Fe ppm | lithium-containing water with 70 ppm Li 360°C.-28 days (with pre-filming) | steam phase 400°C.-262 days |
| 120 | 2070 | 240 |
| 1480 | 1670 | 250 |
| 2920 | 315 | 240 |
| 4300 | 25 | 270 |

The contents of C, Si, S, O$_2$ and Sn were essentially identical for all samples and were below the maximum values given above; they were less than 300 ppm for tin.

Pre-filming is an operation intended to accelerate the response and selectivity of the corrosion test; this operation makes it possible to determine the effect of additives on corrosion more rapidly.

The sample was manufactured by thermo-metallurgical operations comparable to those given above, i.e. not exceeding a temperature of 620° C.

The effect of the Fe/Cr ratio in the precipitates is shown in table 2 below, which gives the increase in weight of alloy samples after being kept in steam for 200 days at a temperature of 400° C. It may be noted that the variation due to change of Fe/Cr is relatively low.

TABLE II

| Fe/Cr in the precipitates | Gain in weight mg/dm$^2$ |
|---|---|
| 0.5 | 100 |
| 1 | 110 |
| 2 | 120 |
| 5 | 110 |
| 30 | 100 |

Complementary tests have shown that similar results are obtained if the chromium is replaced by vanadium. The chromium or vanadium contents are selected so as to be low enough not to cause any major difficulties during the metallurgical treatments and in particular rolling.

At present, the lithium content in the water in pressurized water reactors is not more than a few ppm. This being the case, it is of advantage to keep the tin content to less than 300 ppm. A higher content has a slightly adverse affect on resistance to uniform corrosion in water steam at about 415° C. (whereas its effect on nodular corrosion in steam at 500° C. is negligible).

On the other hand, incorporating tin in a quantity of between 300 and 2000 ppm and in particular between 1000 and 1500 ppm considerably reduces corrosion in an aqueous medium with the levels of lithium content currently used to run reactors. Above 1500 ppm, resistance in the lithium-containing medium is only slightly improved by increasing the tin content so that there would rarely be any point in going above a value of 1500 ppm of tin.

The effects described above are set out in Table III below:

TABLE III

| Corrosion in autoclave | | | |
|---|---|---|---|
| | Mass gain (mg/dm$^2$) | | |
| Tin content as a % | Steam 1 day at 500° C. | Steam 105 days at 415° C. | mass gain in water with 70 ppm lithium after 28 days at 360° C., with pre-heating in steam |
| 0.00 | 37 | 135 | 2560 |
| 0.05 | 43 | 141 | 2270 |
| 0.10 | 43 | 155 | 1200 |
| 0.15 | 42 | 165 | 580 |
| 0.25 | 44 | 173 | 280 |

The tests set out in table III, the purpose of which was to ascertain the effect of tin, were conducted on an alloy with a 1% Nb content, iron, chromium and vanadium being present only as impurities. They demonstrate an unexpectedly favorable effect of tin in a lithium-containing medium without any unacceptable degradation as regards corrosion in steam.

According to the invention, the maximum tin content must be 100 ppm. It is advantageous in that it makes it possible to use Zircaloy 4 and the alloy of the invention on the same industrial plant. Moreover, it makes it possible to avoid the slightly adverse effect on resistance to uniform corrosion in autoclave previously cited. The mechanical properties of the sheathing tube are not adversely altered by tin within this range.

The contents of C, Si, S, O$_2$ and Sn were substantially identical for all samples and were below the maximum values given above.

The sulfur content is kept between 10 and 35 ppm in order to improve the resistance to thermal creep without any adverse effect on the corrosion behaviour.

The oxygen content is kept between 1100 and 1700 ppm. It can be adjusted by a deliberate and controlled addition of zirconia before the alloy is cast. Together with the sulfur addition, such an oxygen content improves the resistance to creep of the sheathing tubes, as well as the mechanical properties in cold conditions (yield strength and maximum strength, in traction and in spalling). Oxygen also favorably influences the phase transformation kinetics in case of loss of primary coolant accident. Within this range, oxygen has no influence on corrosion kinetics.

What is claimed is:

1. A zirconium based alloy comprising a zirconium base and, by weight:
   Fe and at least one of the elements selected from the group consisting of Cr and V, a total of the contents in Fe and Cr+V being 200 to 700 ppm;
   0.8% to 1.3% by weight of niobium;
   1100 to 1700 ppm of oxygen;
   less than 100 ppm of carbon;
   10 to 35 ppm of sulfur;
   less than 50 ppm of silicon and;
   tin content exceeding zero and being 100 ppm or less in weight.

2. A sheathing tube for one of a nuclear fuel rod and a guide tube for a nuclear fuel assembly, made from a zirconium based alloy also containing, by weight, Fe and at least one of the elements selected from the group consisting of Cr and V, a total of the contents in Fe and Cr+V being 200 to 700 ppm; 0.8% to 1.3% by weight of niobium, tin content exceeding zero and being 100 ppm or less, 1100 to 1700 ppm of oxygen, less than 100 ppm of carbon, 10 to 35 ppm of sulfur and less than 50 ppm of silicon, in the recrystallized state, at least the greater part of the iron being in the form $Zr(Nb, Fe, Cr)_2$ or $Zr(Nb, Fe, V)_2$ and in which the intermetallic compounds are of a size not exceeding 200 nm.

3. A sheet of alloy as claimed in claim 1.

4. The zirconium based alloy of claim 1, wherein a ratio by weight of the Fe to the at least one of the elements selected from the group consisting of Cr and V is between 0.5 and 30.

5. The sheathing tube of claim 2, wherein a ratio by weight of the Fe to the at least one of the elements selected from the group consisting of Cr and V is between 0.5 and 30.

6. The sheet of claim 3, wherein a ratio by weight of the Fe to the at least one of the elements selected from the group consisting of Cr and V is between 0.5 and 30.

7. The sheathing tube of claim 2, wherein the intermetallic compounds are of a size exceeding 100 nm.

* * * * *